US012413888B2

(12) United States Patent
Andrikowich et al.

(10) Patent No.: US 12,413,888 B2
(45) Date of Patent: Sep. 9, 2025

(54) WEARABLE AUDIO DEVICE WITH MODULAR COMPONENT ATTACHMENT

(71) Applicant: Bose Corporation, Framingham, MA (US)

(72) Inventors: Thomas George Andrikowich, Whitinsville, MA (US); Michael Camille Salame, Waltham, MA (US)

(73) Assignee: Bose Corporation, Framingham, MA (US)

( * ) Notice: Subject to any disclaimer, the term of this patent is extended or adjusted under 35 U.S.C. 154(b) by 29 days.

(21) Appl. No.: 18/133,417

(22) Filed: Apr. 11, 2023

(65) Prior Publication Data
US 2023/0254622 A1 Aug. 10, 2023

Related U.S. Application Data

(63) Continuation of application No. 16/930,579, filed on Jul. 16, 2020, now Pat. No. 11,627,400.

(51) Int. Cl.
| | |
|---|---|
| *H04R 1/10* | (2006.01) |
| *H01R 13/627* | (2006.01) |
| *H01R 13/629* | (2006.01) |
| *H04B 1/3827* | (2015.01) |
| *H04R 5/033* | (2006.01) |

(52) U.S. Cl.
CPC .............. *H04R 1/10* (2013.01); *H01R 13/627* (2013.01); *H01R 13/629* (2013.01); *H04B 1/385* (2013.01); *H04R 5/0335* (2013.01); *H04B 2001/3866* (2013.01); *H04B 2001/3872* (2013.01); *H04R 2420/09* (2013.01); *H04R 2460/01* (2013.01)

(58) Field of Classification Search
None
See application file for complete search history.

(56) References Cited

U.S. PATENT DOCUMENTS

| | | | |
|---|---|---|---|
| 2011/0143820 A1* | 6/2011 | Heil | H04R 1/083 455/569.1 |
| 2016/0198254 A1* | 7/2016 | Gecawicz | H04R 1/1058 381/375 |
| 2021/0186140 A1* | 6/2021 | Barber | A42B 3/306 |

\* cited by examiner

*Primary Examiner* — Kenny H Truong
(74) *Attorney, Agent, or Firm* — Hoffman Warnick LLC

(57) ABSTRACT

Various aspects include wearable audio devices enabling modular component attachment and detachment. In certain implementations, a wearable audio device includes: a headband for contacting a head of a user; an earpiece coupled with the headband for positioning proximate an ear of the user, the earpiece having an electro-acoustic transducer configured to output audio signals; and a slot configured to engage an electronic component, where the slot includes one or more snap-fit and/or friction-fit connectors for selectively engaging the electronic component.

20 Claims, 13 Drawing Sheets

WEARABLE AUDIO DEVICE WITH MODULAR COMPONENT ATTACHMENT

CROSS-REFERENCE TO RELATED APPLICATION

This application is a continuation application and claims benefit of U.S. patent application Ser. No. 16/930,579, filed Jul. 16, 2020, the contents of which are herein incorporated by reference in their entirety.

TECHNICAL FIELD

This disclosure generally relates to wearable audio devices. More particularly, the disclosure relates to a wearable audio devices that enable modular component attachment and detachment.

BACKGROUND

Wearable audio devices, for example, headsets, can include modular components for enabling and/or enhancing device functions. In particular form factors, wearable audio devices are configured to enable coupling with external devices such as microphones (e.g., boom microphones). However, attaching and detaching external devices can be time-consuming and cumbersome, sometimes requiring external tools. Additionally, external device connections are prone to slack or loose fitting, which can cause undesirable mechanical and/or electrical noise in the audio device.

SUMMARY

All examples and features mentioned below can be combined in any technically possible way.

Various implementations of the disclosure include wearable audio devices enabling modular electronic component attachment. Various additional implementations of the disclosure include systems that include the wearable audio device and one or more electronic components.

In some particular aspects, a wearable audio device includes: a headband for contacting a head of a user; an earpiece coupled with the headband for positioning proximate an ear of the user, the earpiece including an electro-acoustic transducer configured to output audio signals; and a slot configured to engage an electronic component, where the slot includes one or more snap-fit and/or friction-fit connectors for selectively engaging the electronic component.

In other particular aspects, a system includes: a wearable audio device, having: a headband; an earpiece coupled with the headband for positioning proximate an ear of the user, the earpiece including an electro-acoustic transducer configured to output audio signals; and a slot configured to engage an electronic component, where the slot includes one or more snap-fit and/or friction-fit connectors; and an electronic component selectively coupleable with the one or more snap-fit and/or friction-fit connectors, where the electronic component is configured to be inserted in the slot in a first direction, and when engaged, the one or more snap-fit and/or friction-fit connectors alone prevent movement of the electronic component relative to the slot in a second direction that is opposite the first direction.

In further particular aspects, an electronic component configured to engage with a wearable audio device includes: a portion configured to be inserted into a slot in the wearable audio device in an insertion direction, the slot comprising one or more snap-fit and/or friction-fit connectors; and a moveable arm configured to selectively engage the one or more snap-fit and/or friction-fit connectors, wherein, when the moveable arm is engaged with the one or more snap-fit and/or friction-fit connectors, the one or more snap-fit and/or friction-fit connectors provide a resistive force against the moveable arm in response to a force on the portion in a direction opposite the insertion direction.

Implementations may include one of the following features, or any combination thereof.

In certain aspects, each of the snap-fit and/or the friction-fit connectors includes at least one fixed protrusion within the slot that is sized to complement a movable arm in the electronic component in a locked position.

In some cases, the fixed protrusion includes a ridge with an opening extending at least partially therethrough, and the movable arm is configured to: engage the opening in the fixed protrusion in the locked position, and disengage the opening in the fixed protrusion in an unlocked position.

In particular implementations, each of the snap-fit and/or friction-fit connectors is aligned to provide a resistive force against the moveable arm in response to a downward force on the electronic component while in the locked position.

In certain aspects, the one or more snap-fit and/or friction-fit connectors includes a pair of snap-fit and/or a pair of friction-fit connectors for selectively engaging a pair of movable arms in the electronic component.

In some cases, the electronic component is configured to be inserted in the slot in a first direction, and when engaged, the one or more snap-fit and/or friction-fit connectors alone prevents movement of the electronic component relative to the slot in a second direction that is opposite the first direction.

In particular aspects, the one or more snap-fit and/or friction-fit connectors enables tool-less coupling and decoupling of the earpiece and the electronic component.

In certain implementations, the wearable audio device further includes an additional earpiece and an additional slot, where the additional slot is configured to engage the electronic component.

In some aspects, the electronic component includes at least one of: a boom microphone, a battery module, a power connector, a sensor module, a communications module, a self-powered communications module or a microphone module.

In particular implementations, when connected with the earpiece in the slot, the electronic component and the at least one earpiece are positioned to form an acoustic seal around an ear of the user.

In certain aspects, the acoustic seal aids in noise cancelation functions of the wearable audio device.

In some implementations, the wearable audio device includes an aviation headset that is configured to connect with an electronic flight bag.

In particular aspects, the at least one earpiece includes an opening connected with the slot for accommodating an electronic component connection.

In certain cases, in a locked position, the at least one earpiece is configured to engage a gasket proximate the electronic component connection for sealing the electronic component connection with the earpiece.

In some implementations, the electronic component is potted to additionally seal the electronic component connection and the slot in the locked position.

In particular cases, the sealed electronic component connection approximately isolates electrical noise from movement of the electronic component relative to the earpiece.

In certain implementations, the electronic component includes a boom microphone, and in a locked position, the boom microphone is configured to rotate relative to the earpiece.

In some aspects, the wearable audio device further includes a controller coupled with the electro-acoustic transducer and configured to connect with the electronic component in a locked position.

In particular cases, each of the snap-fit and/or the friction-fit connectors includes at least one fixed protrusion within the slot that is configured to complement the movable arm in the electronic component in the locked position.

In certain implementations, the electronic component further includes an additional movable arm configured to selectively engage an additional one of the snap-fit and/or friction fit connectors in the slot.

In particular cases, the electronic component is configured to be inserted in the slot in the wearable audio device in a first direction, and when engaged, the moveable arms and the one or more snap-fit and/or friction-fit connectors alone prevent movement of the electronic component relative to the slot in a second direction that is opposite the first direction.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
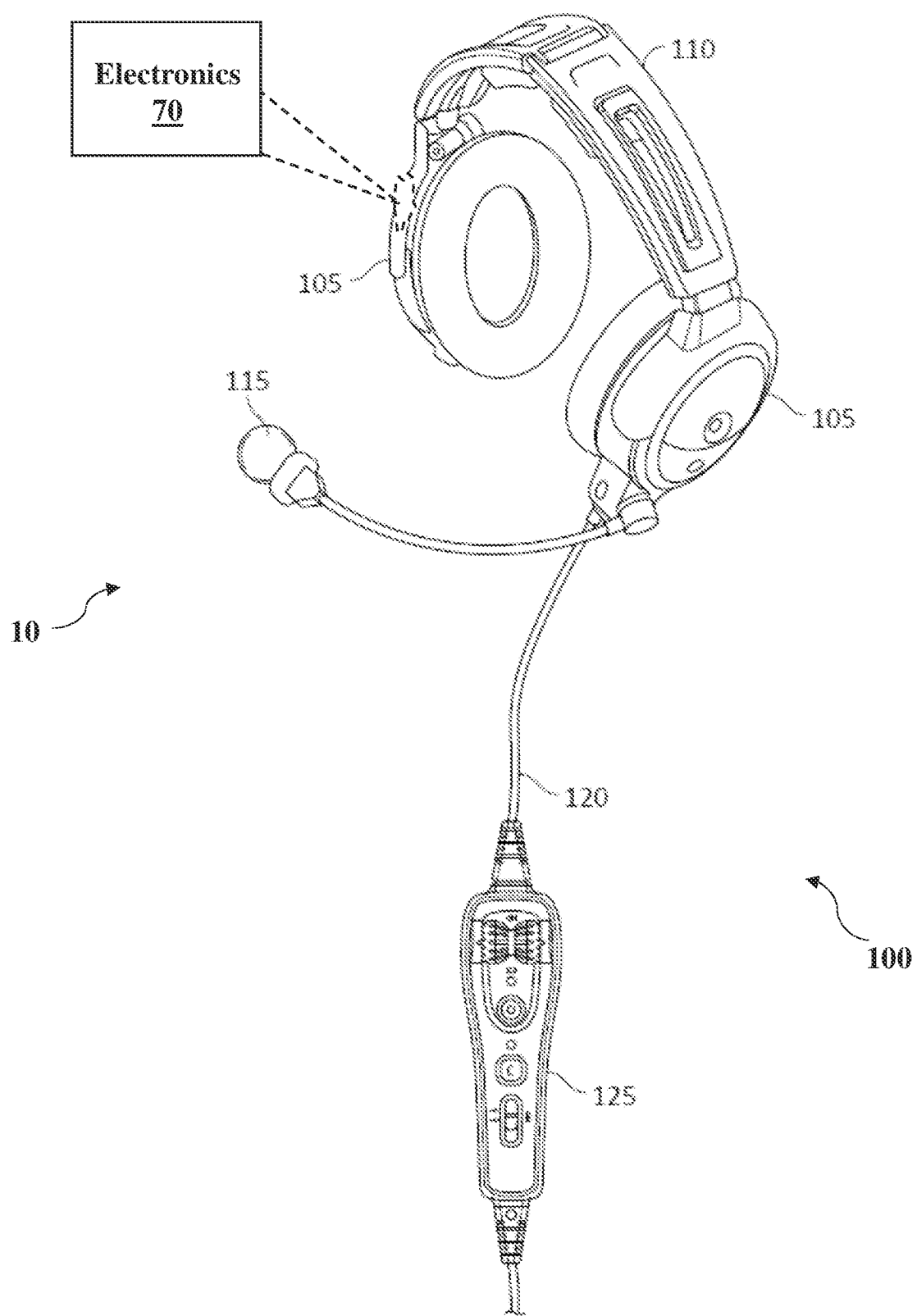
FIG. 1 is a schematic depiction of an audio device according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to wearable audio devices enabling modular component attachment and detachment. More particularly, aspects of the disclosure relate to wearable audio devices with an earpiece that is configured to selectively engage (or, couple with) an electronic component. In particular cases, the earpiece includes a slot with one or more snap-fit and/or friction-fit connectors for selectively engaging an electronic component and retaining the electronic component in contact with the earpiece.

The attachment mechanisms disclosed according to various implementations provide a number of benefits. For example, attachment mechanisms according to various implementations can help to limit (and in some cases, prevent) movement of an electronic component relative to an earpiece slot. In certain cases, when engaged, the attachment mechanisms aids in forming a seal with an earcup-type earpiece on the user's head. The attachment mechanisms disclosed according to various implementations can also counter downward forces on the electronic component (e.g., pulling or tugging forces), enabling constant electrical connection with the earpiece.

Commonly labeled components in the FIGURES are considered to be substantially equivalent components for the purposes of illustration, and redundant discussion of those components is omitted for clarity.

Aspects and implementations disclosed herein may be applicable to a wide variety of wearable audio devices. In some cases, wearable audio devices can take various form factors, such as headphones (whether on or off ear), headsets, watches, eyeglasses, audio accessories or clothing (e.g., audio hats, audio visors, audio jewelry), neck-worn speakers, shoulder-worn speakers, body-worn speakers, etc. Some aspects disclosed may be particularly applicable to personal (wearable) audio devices such as over-ear headphones, on-ear headphones, in-ear headphones (also referred to as earbuds), audio eyeglasses or other head-mounted audio devices.

The wearable audio devices described according to various implementations can include features found in one or more other wearable electronic devices, such as smart glasses, smart watches, etc. These wearable audio devices can include additional hardware components, such as one or more cameras, location tracking devices, microphones, etc., and may be capable of voice recognition, visual recognition, and other smart device functions. The description of wearable audio devices included herein is not intended to exclude these additional capabilities in such a device.

As noted herein, conventional modular wearable audio devices can include cumbersome attachment mechanisms, which in many cases, can cause poor mechanical and/or electrical connections. These poor connections can also negatively impact audio performance.

In contrast to conventional devices, various implementations include wearable audio devices and related systems that enable snap-fit and/or friction-fit connection between the earpiece and an electronic component. The snap-fit and/or friction fit connector provides a secure connection between the electronic component and the earpiece.

Some example implementations relate to audio devices that include aviation headsets. Aviation headsets are used by pilots in both general aviation and commercial aviation. Such headsets can be connected to aircraft communication systems, for example to communicate with air-traffic control (ATC) or with other pilots. The headsets can also be used as a public addressing system, for example, for the pilots to speak with passengers on board the aircraft. The aircraft communication systems typically include an analog communication system such as an intercom. In some cases, such an intercom system can be configured to communicate over the very-high-frequency (VHF) bands (e.g., 18 MHz to 136.975 MHz) wherein each channel is separated from the adjacent ones by a band of pre-specified width (e.g., 8.33 kHz in Europe, 25 kHz elsewhere). An analog modulation technique such as amplitude modulation (AM) can be used for the communications, and the conversations may be performed in simplex mode. In some cases, for example, for trans-oceanic flights, other frequency bands such as high-frequency (HF) bands can be used for satellite communications. Aviation headsets may be used, for example, by pilots and air-traffic controllers to communicate with one another.

An example of a wearable audio device 10 that includes an aviation headset 100 is shown in FIG. 1. In particular cases, the headset 100 includes a frame that has at least one earpiece (e.g., ear-cup) 105 on each side, which fits on, around, or over the ear of a user. In some cases, the frame is optional, such that the earpiece 105 is either tethered or wirelessly connected to other components in the wearable audio device 10. Each of the ear-cups 105 houses acoustic transducers or speakers. The headset 100 also includes a headband (e.g., an over-the-head bridge) 110 for connecting the two earpieces (e.g., ear-cups) 105. In various implementations, the headset 100 is configured to position at least one, and in some cases both, earpieces 105 proximate ears of the user. For example, the headset 100 (and other headset forms of audio device 10 described herein) can be configured, when worn by a user, to position the earpiece(s) 105 proximate to a user's ear. In certain cases, this proximity includes positioning the earpiece(s) 105 on or over the ears (e.g., using earcups), in the ears (e.g., using earbuds), resting on the ears (e.g., using ear hooks), etc. In some cases, proximate positioning results in full, partial, or no occlusion of the user's ear.

In some implementations, an electronic component (e.g., a microphone such as a boom microphone) 115 may be physically connected to one of the ear-cups 105. The headset 100 can be connected to the aircraft intercom system using the connecting cable 120, which may also include a control module 125 that includes one or more controls for the headset 100. In certain cases, the analog signals to and from the aircraft intercom system are transmitted through the wired connection provided by the connecting cable 120. In other cases, or in additional cases, the headset 100 can include electronics 70, such as control chips and/or circuitry, electro-acoustic transducer(s), microphones and associated modules, power components such as batteries and/or connectors, interface components such as capacitive touch interface components, etc. In particular cases, the electronics 70 include a controller coupled with an electro-acoustic transducer, where the controller is also configured to connect with an electronic component when in a locked position with the audio device 10.

It is further understood that electronics 70 can include other components not specifically depicted in the accompanying FIGURES, such as communications components (e.g., a wireless transceiver (WT)) configured to communicate with one or more other electronic devices connected via one or more wireless networks (e.g., a local WiFi network, Bluetooth connection, or radio frequency (RF) connection), and amplification and signal processing components. Electronics 70 can also include motion and/or position tracking components, such as optical tracking systems, inertial measurement units (IMUs) such as a microelectromechanical system (MEMS) device that combines a multi-axis accelerometer, gyroscope, and/or magnetometer, etc.

While the example in FIG. 1 illustrates an aviation headset that includes around-ear ear-cups, aviation headsets having other form-factors, including those having in-ear headphones or on-ear headphones, are also compatible with the technology described herein. In an example involving in-ear headphones, the over-the-head bridge may be omitted, and the boom microphone may be attached to the user via the headset or via a separate structure. Also, the term headset, as used in this document, includes various types of acoustic devices that may be used for aviation purposes, including, for example, earphones and earbuds. Additional headset features are disclosed, for example, in U.S. patent application Ser. No. 15/238,259 ("Communications Using Aviation Headsets," filed Aug. 16, 2016), which is incorporated herein by reference in its entirety.

It is further understood that any component described as connected or coupled to another component in the audio device 10 or other systems disclosed according to implementations may communicate using any conventional hard-wired connection and/or additional communications protocols. In some cases, communications protocol(s) can include a Wi-Fi protocol using a wireless local area network (LAN), a communication protocol such as IEEE 802.11 b/g a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc. In various particular implementations, separately housed components in audio device 10 are configured to communicate using one or more conventional wireless transceivers.

Figure 2:
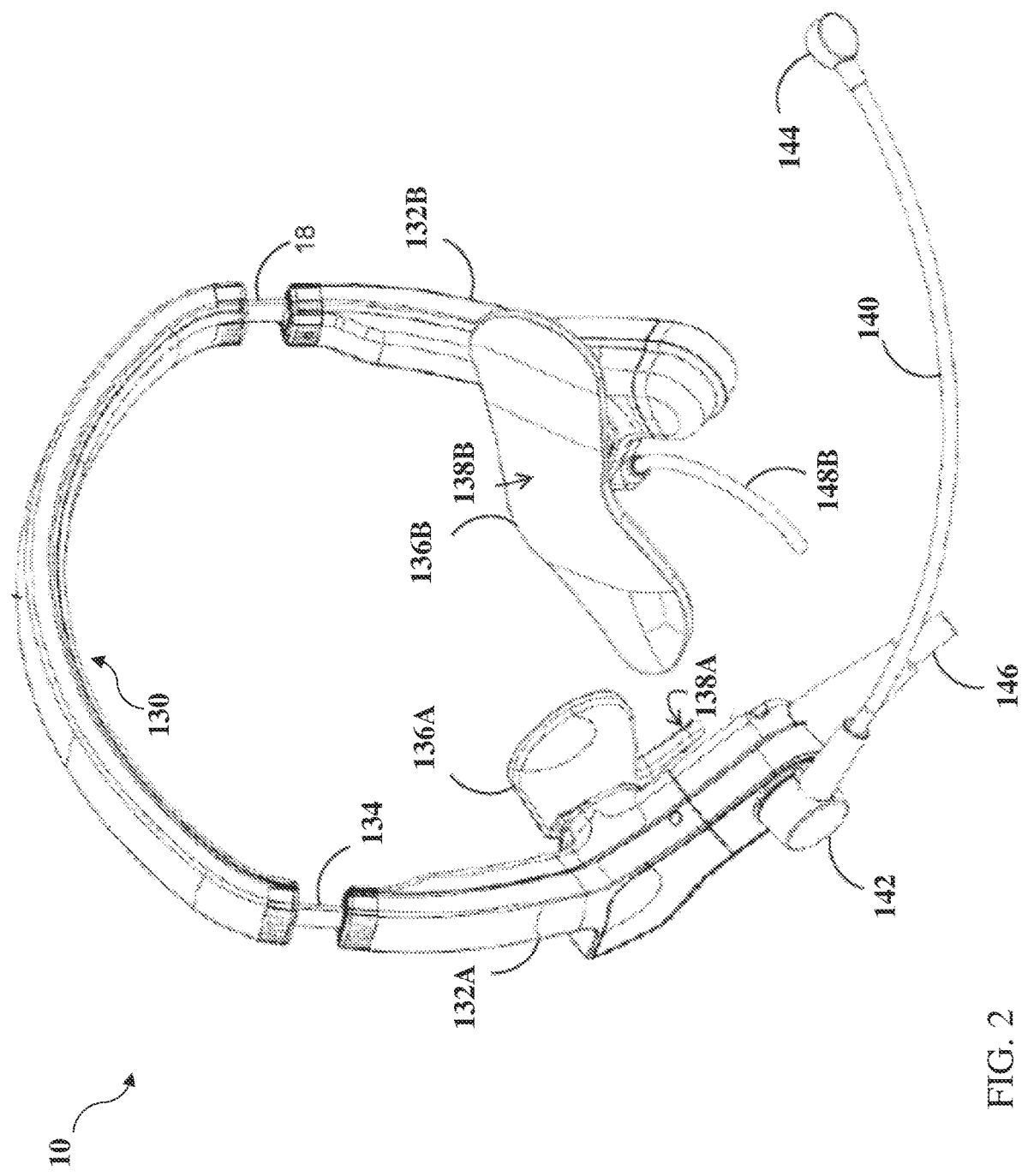
FIG. 2 is a schematic depiction of another audio device according to various implementations.

It is understood that the wearable audio devices 10 according to various implementations can take additional form factors. For example, FIG. 2 shows a wearable audio device 10 in the form of a personal communications headset 10 (e.g. an aviation headset). Reference numbers followed by an "A" or a "B" indicate a feature that corresponds to the right side or the left side, respectively, of the audio device 10. The audio device 10 includes a headband having an arcuate section 130, a right end and a left end. A right housing 132A and a left housing 132B are located at the right end and the left end, respectively, of the headband. The arcuate section 130 serves as an over-the-head bridge between the right and left housings 132. A spring band 134 (e.g., spring steel) extends from the right housing 132A, through the arcuate section 130 and to the left housing 132B. The spring band 134 provides a clamping force to move the housings 132 toward each other (approximately along a horizontal plane through the wearer's head) while the headband is worn by a user. The right and left housings 132 can be moved a distance either up and toward or down and away from the arcuate section 130 to accommodate a smaller or larger head, respectively.

A pad (right pad 136A or left pad 136B, generally 136) is attached to each housing 132 and is used to comfortably secure the headset 10 to the head. As used herein, a "pad" means a compliant member that can compress and/or deform under an applied pressure and that is configured for contact with the head of a user in a manner that supports the headband. In some cases, when the audio device (headset) 10 is worn on the head, each pad 136 extends from its forward end above the ear to its back end, which is lower on the head and behind the ear. In certain cases, the pads 136 each have a contoured surface 138 for contacting the head of the user. A boom 140 extends from a rotatable base 142 near the bottom of one of the housings (e.g., as illustrated, the right housing 132A) and is used to position and support a microphone 144 attached at the other end. The boom 140 may be adjusted, in part, by rotation about its base 142 to place the microphone 144 in proper position with respect to the mouth of the user. The boom 140 may be permanently affixed to the housing 132A or may be removable so that the audio device 10 can be used for both aviation and non-aviation uses (e.g., music playback). A connector 146 for a communications cable extends from the bottom of the right housing 132A. An earpiece (e.g., earbud) connector cable 148 extends at one end from each housing 132. The opposite end of the flexible cable 148 is suitable for connecting to an earpiece such as an earbud or other type of in-ear headphone. Additional features of the audio device 10 in FIG. 2 are described in U.S. Pat. No. 10,187,718, which is entirely incorporated by reference herein.

Figure 3:
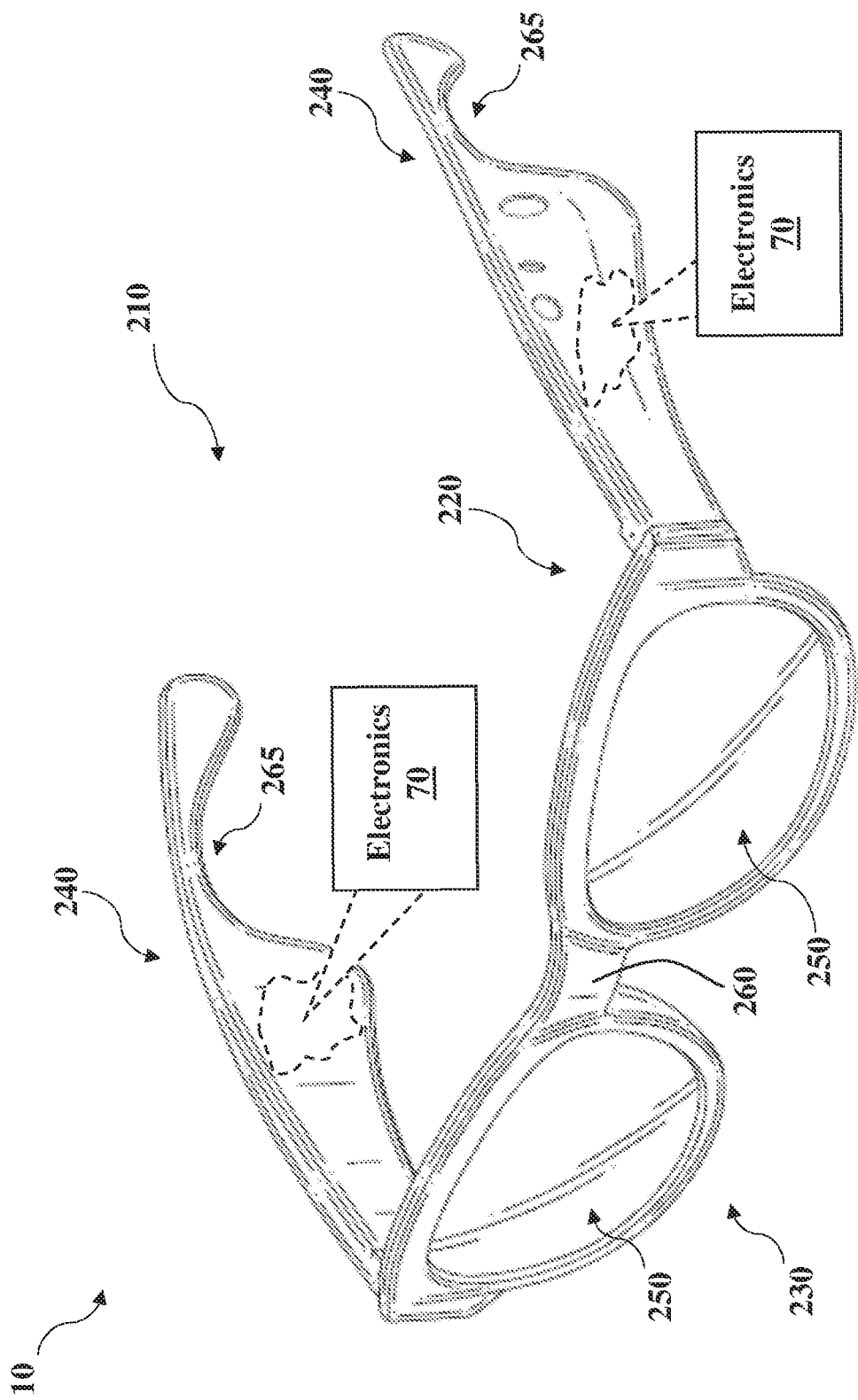
FIG. 3 is a schematic depiction of an additional audio device according to various implementations.

FIG. 3 illustrates an additional example audio device 10, including audio eyeglasses 210. As shown, the audio eyeglasses 210 can include a headband (e.g., frame) 220 having a lens region 230 and a pair of arms 240 extending from the lens region 230. As with conventional eyeglasses, the lens region 230 and arms 240 are designed for resting on the head of a user. The lens region 230 can include a set of lenses 250, which can include prescription, non-prescription and/or light-filtering lenses, as well as a bridge 260 (which may include padding) for resting on the user's nose. Arms 240 can include a contour 265 for resting on the user's respective ears. Contained within the frame 220 (or substantially contained, such that a component can extend beyond the boundary of the frame) are electronics 70 and other components for controlling the audio eyeglasses 210 according to particular implementations. Electronics 70 can include portions of, or connectors for, one or more electronic components as described with respect to the audio devices 10 herein. In some cases, separate, or duplicate sets of electronics 70 are contained in portions of the frame, e.g., each of the respective arms 240 in the frame 220. However, certain components described herein can also be present in singular form.

Figure 4:
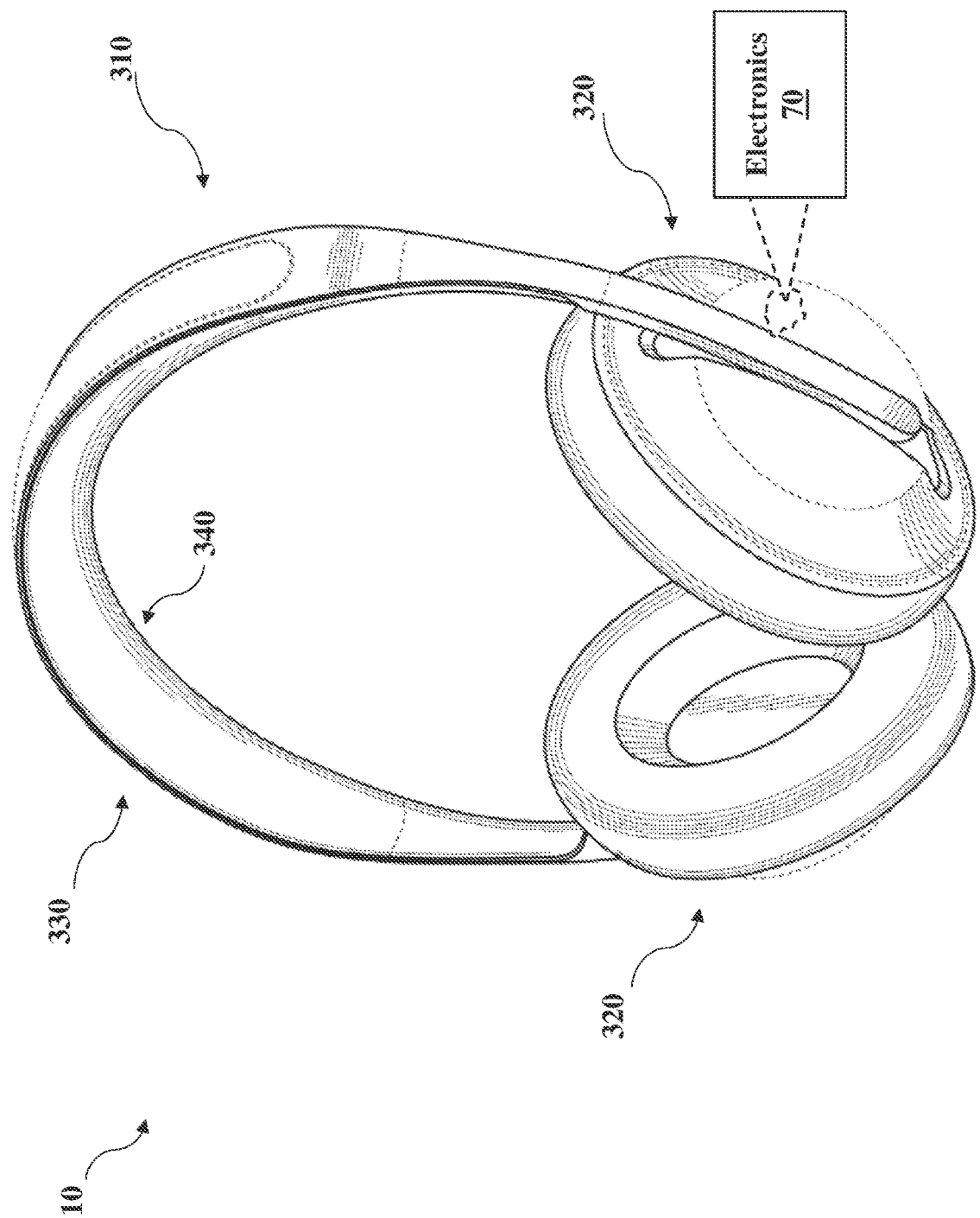
FIG. 4 is a schematic depiction of another audio device according to various implementations.

FIG. 4 depicts another audio device 10, including around-ear headphones 310. Headphones 310 can include a pair of earpieces (e.g., ear-cups) 320 configured to fit over the ear, or on the ear, of a user. A headband 330 spans between the pair of earpieces 320 and is configured to rest on the head of the user (e.g., spanning over the crown of the head or around the head). The headband 330 can include a head cushion 340 in some implementations. Stored within one or both of the earpieces 320 are electronics 70 and other components for controlling the headphones 310 according to particular implementations. Electronics 70 can include portions of, or connectors for, one or more electronic components as described with respect to the audio devices 10 herein. It is understood that a number of wearable audio devices described herein can utilize the features of the various implementations, and the wearable audio devices 10 shown and described with reference to FIGS. 1-4 are merely illustrative.

Figure 5:
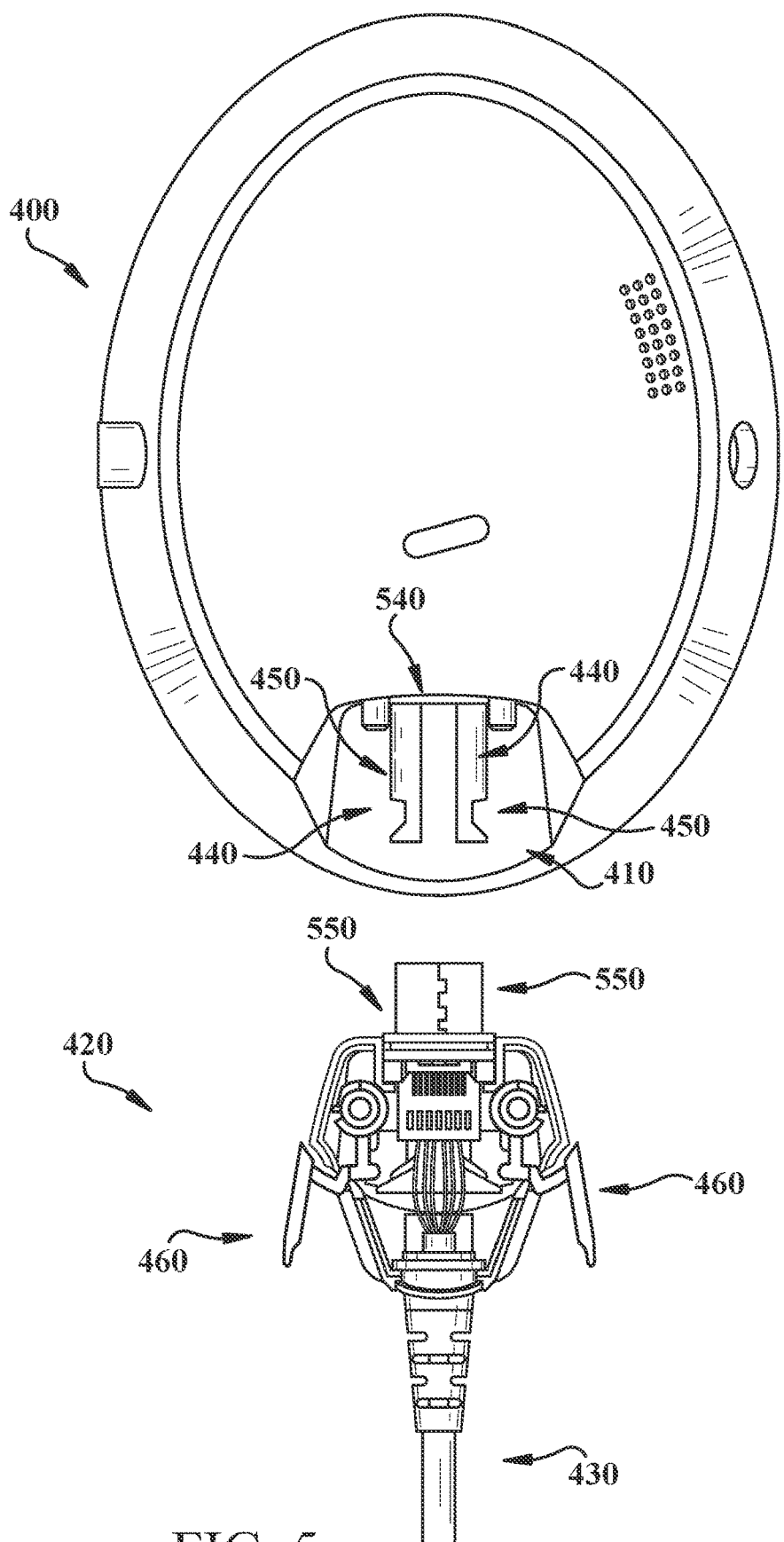
FIG. 5 is a side view of an earpiece and an electronic component according to various implementations.
Figure 6:
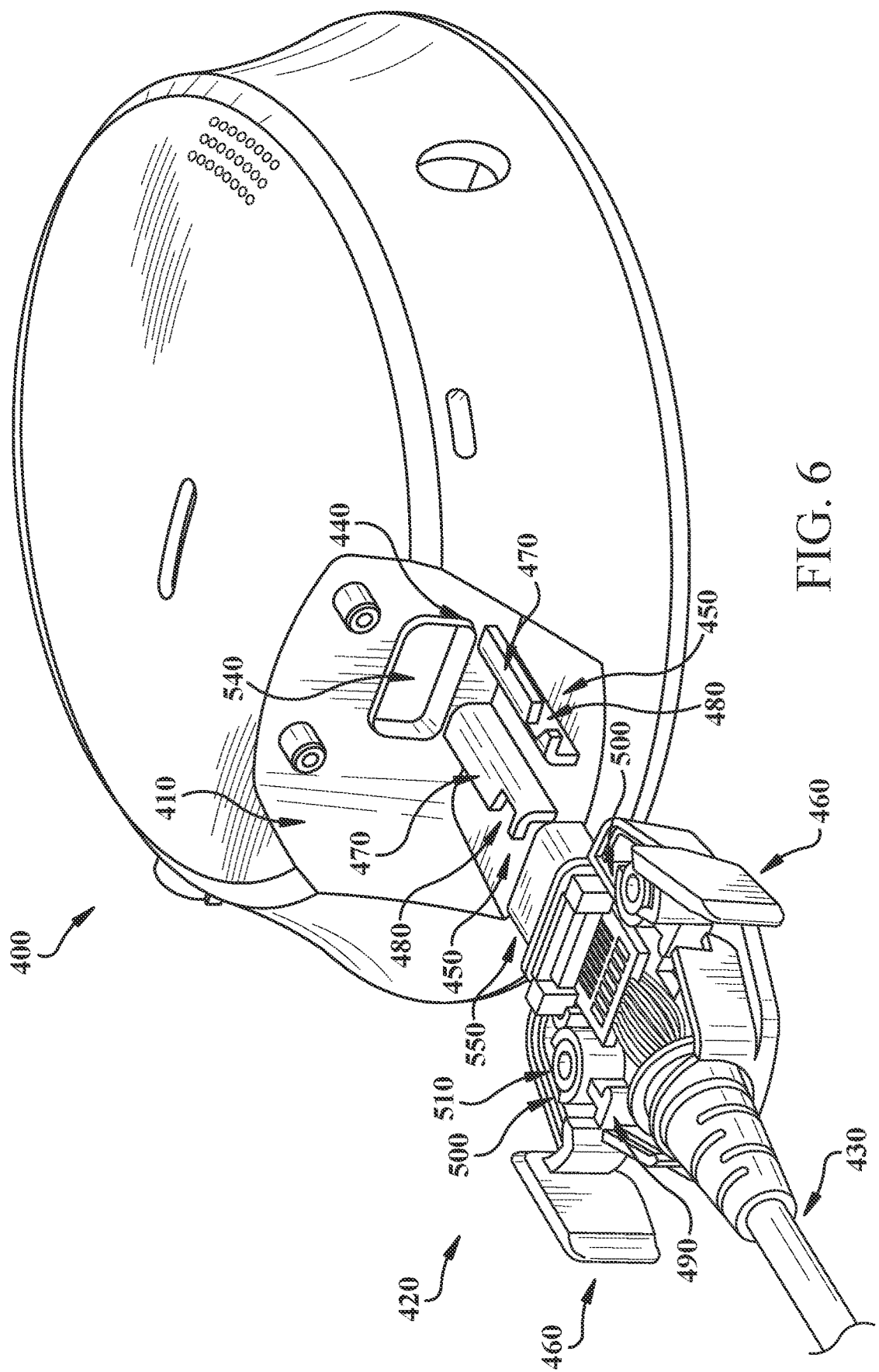
FIG. 6 is a perspective view of an earpiece and an electronic component according to various implementations.

FIGS. 5 and 6 show a side view, and a perspective view, respectively, of an earpiece 400 in an audio device 10 according to various implementations. In some cases, the earpiece 400 includes an ear-cup such as the ear-cup 105 in the aviation headsets in FIGS. 1 and/or 2, or the ear-cup in the over-ear headset shown in FIG. 4. In other cases, the earpiece 400 can represent a portion of an in-ear, or near-ear earpiece that is configured to output audio to the ear of a user, e.g., in the arm 240 of audio eyeglasses shown in FIG. 3.

In this example implementation, the earpiece 400 includes a slot 410 configured to engage an electronic component 420. In this example, the electronic component 420 includes a connector 430 such as a cable connector (e.g., cable connector 120 in FIG. 1). However, the electronic component 420 can take any form capable of selectively engaging the earpiece 400. For example, in some cases, the electronic component 420 includes: a boom microphone, a battery module, a power connector, a sensor module, a communications module (e.g., a Bluetooth module), a self-powered communications module (e.g., self-powered Bluetooth module), and/or a microphone module. While one earpiece 400 is illustrate in various FIGURES herein, it is understood that both earpieces 400 in an audio device 10 can be equipped with a slot 410 for accommodating one or more electronic components 420, e.g., for engaging the same type of electronic component or distinct types of electronic components.

Figure 7:
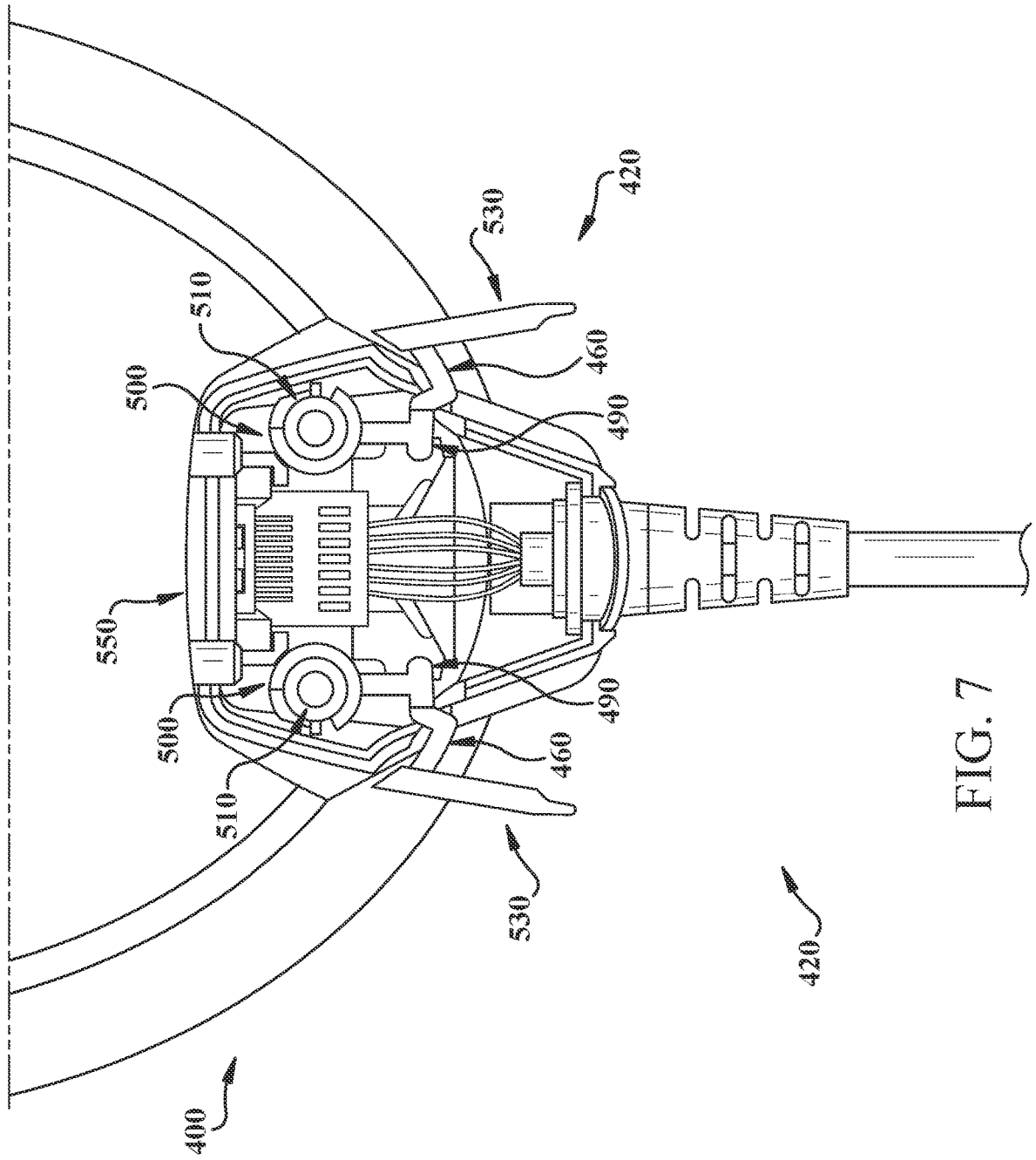
FIG. 7 is a close-up side view of an earpiece engaging an electronic component according to various implementations.
Figure 8:
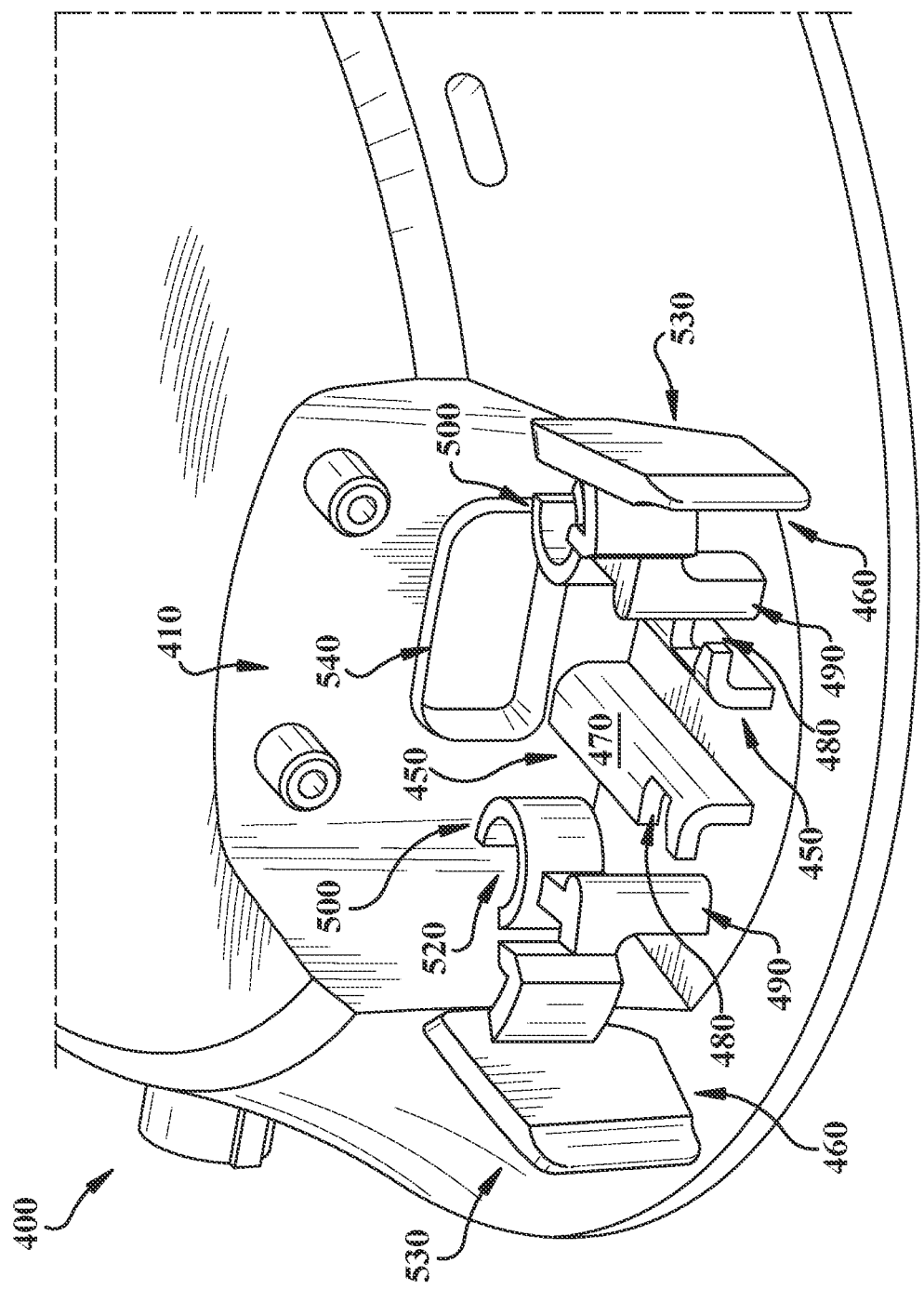
FIG. 8 is a perspective view of a movable arm in isolation with an earpiece according to various implementations.
Figure 9:
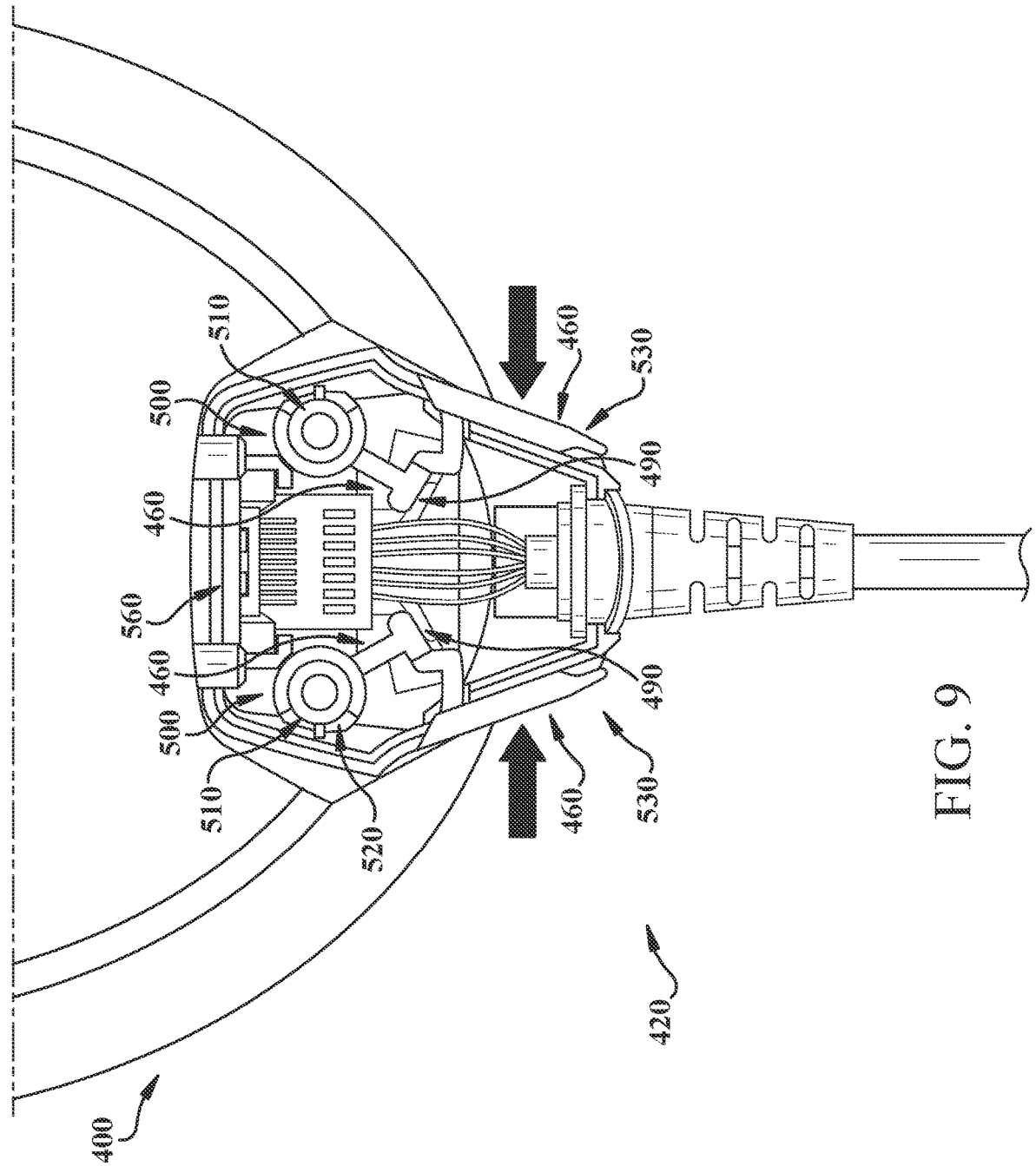
FIG. 9 is a side view of an electronic component engaged with an earpiece according to various additional implementations.
Figure 10:
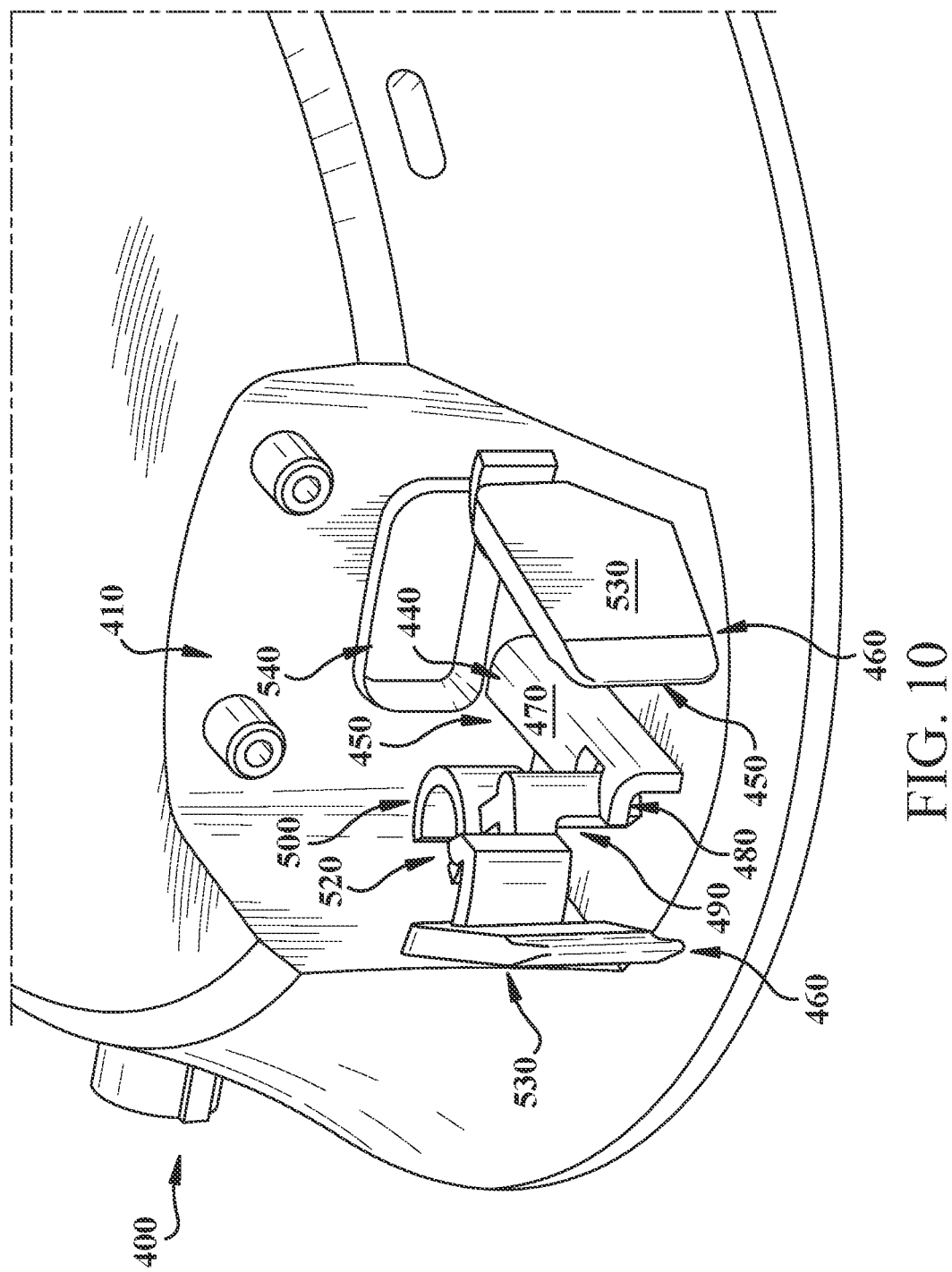
FIG. 10 is a perspective view of the moveable arm from FIG. 8, in isolation, and engaged with a protrusion in the electronic component.

In various implementations, the slot 410 includes at least one connector 440 for selectively engaging (e.g., coupling with) the electronic component 420 and retaining the electronic component 420 in contact with the earpiece 400. In certain implementations, the connector 440 includes one or more snap-fit and/or friction-fit connectors. In particular examples, each of the snap-fit connector (s) and/or friction fit connector(s) (or, "connector") 440 includes at least one fixed protrusion 450 within the slot 410 that is sized to complement a moveable arm 460 in the electronic component 420 in a locked position. In some examples, the connector 440 includes a plurality of fixed protrusions 450, e.g., a pair of fixed protrusions 450 illustrated in FIGS. 4 and 5 for selectively engaging a pair of movable arms 460 in the electronic component 420. In certain implementations, each fixed protrusion 450 includes a ridge 470 with an opening 480 (FIG. 6) extending at least partially therethrough. In some cases, the movable arm 460 on the electronic component 420 is configured to engage and disengage the opening 480 in the fixed protrusion 450. That is, in certain implementations, the moveable arm 460 is configured to engage the opening 480 in the fixed protrusion 450 in a locked position, and disengage the opening 480 in an unlocked position. FIGS. 7 and 8 show side and perspective views, respectively, illustrating the movable arm 460 as it relates to the fixed protrusion 450 in an engaged, but not locked position. FIGS. 9 and 10 show side and perspective views, respectively, illustrating the movable arm 460 as it relates to the fixed protrusion 450 in a locked position. FIGS. 8 and 10 illustrate the moveable arm(s) 460 in isolation relative to the fixed protrusion(s) 450.

Figure 11:
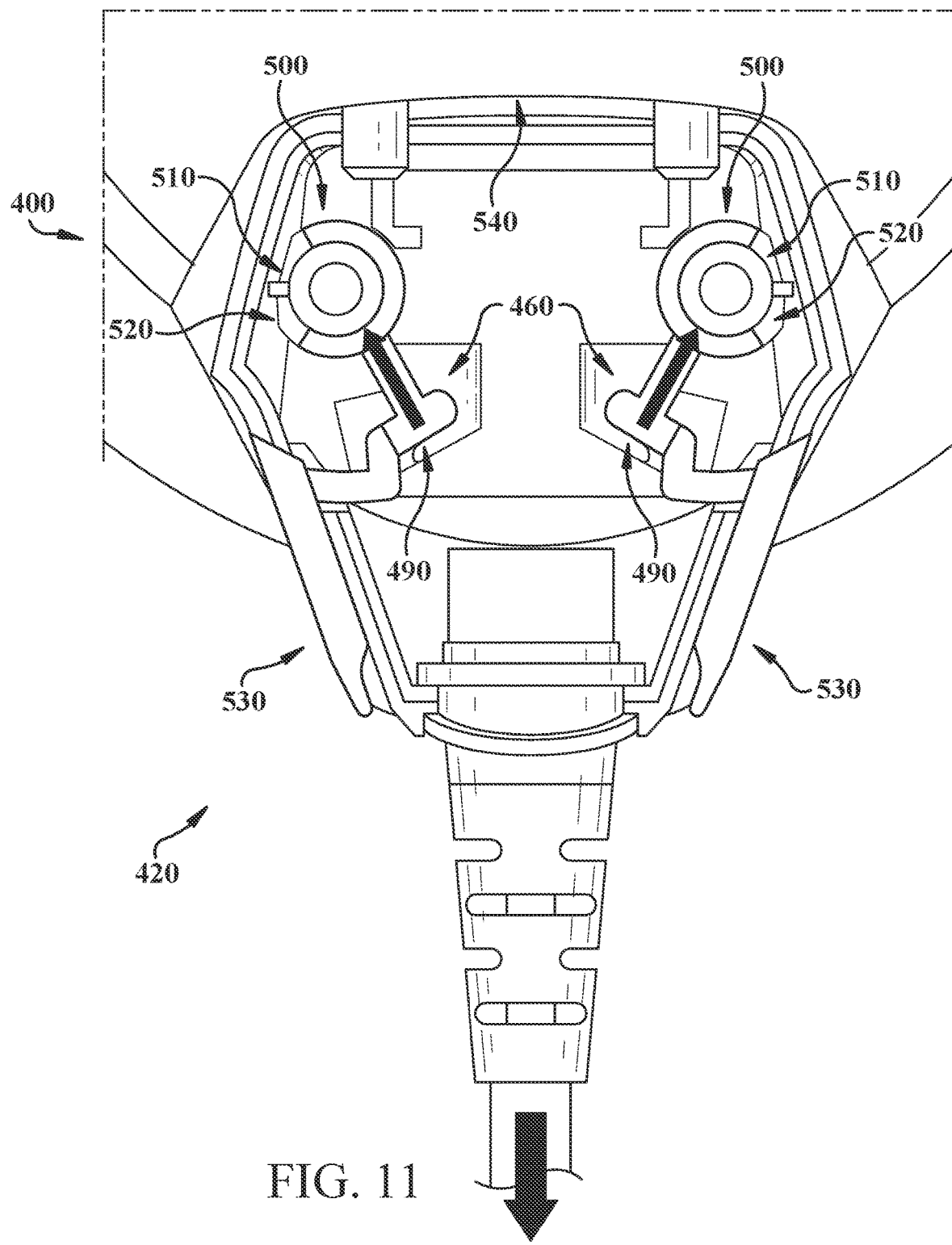
FIG. 11 is side view of an electronic component engaged with an earpiece, illustrating the resistive force of the moveable arms, according to various implementations.

In certain implementations, the movable arm 460 includes a tab (or protrusion) 490 that is shaped to complement the opening 480 in the fixed protrusion 450. That is, in various implementations, the tab 490 is configured to mate with the opening 480 to engage the moveable arm 460 with the fixed protrusion 450. In certain cases, the tab 490 is sized to contact the fixed protrusion 450 at one or more surfaces inside the opening 480, and in particular cases, the tab 490 is sized to substantially fill the opening 480 when engaged. Additionally, the movable arm 460 can include at least one rotatable or pivotable member 500 for moving about a fixed pin (or pillar) 510 on the electronic component 420 (FIGS. 7, 9 and 11). The rotatable or pivotable member 500 can include an opening 520 for slidingly engaging the fixed pin (or pillar) 510, e.g., such that the rotatable or pivotable member 500 rotates about the fixed pin (or pillar) 510 to aid in locking the movable arm 460 with the earpiece 400.

With reference to FIGS. 5-10, with particular reference to FIGS. 9 and 10, it can be seen that the connector 440 is aligned to provide a resistive force against the movable arm 460 in response to a downward force on the electronic component 420 when in a locked position. FIG. 11 shows a close-up side view of the electronic component 420 locked in the slot 410. As shown in this depiction, as a downward force (large arrow) is applied to the electronic component 420 in the locked position, the connector 440 provides a resistive force against the arm(s) 460 to maintain coupling between the electronic component 430 and the connector. In certain cases, when in the locked position, the connector 440 alone provides the resistive force needed to prevent downward motion of the electronic component 420 relative to the earpiece 400. That is, in particular cases, the electronic component 420 is configured to be inserted in the slot 410 in a first direction, and when engaged (e.g., locked), the connector 440 alone prevents movement of the electronic component 420 relative to the slot 410 in a second direction that is opposite the first direction. In some cases, the first direction is upward, and the second direction is downward. However, in other cases, the first direction can be into the page (e.g., as depicted in the side view of FIG. 11), while the second direction can be out of the page. In other terms, when engaged, the connector 440 alone substantially retains the electronic component 420 in a locked position with the earpiece 400.

As can be seen in FIGS. 5-11, in various implementations the movable arm(s) 460 include an actuatable section 530 that is accessible from an exterior of the electronic component 420 even when the electronic component 420 is engaged (e.g., in a locked position) with the earpiece 400. That is, when the connector 440 is inserted in the slot 410, the actuatable section 530 of the arm(s) 460 remain external to the slot 410, such that a user can control engaging and disengaging the electronic component 420 from the earpiece 400. In these cases, the user can push or pull the actuatable section(s) 530 to move the arm(s) 460 for engaging and/or disengaging the fixed protrusion 450. That is, in certain cases as depicted in FIGS. 5 and 7, after engaging the connector 440 in the slot 410, the user can apply a clamping or inward force on the actuatable sections 530 to move the arms 460 and lock the arms 460 with the fixed protrusions 450. As described herein, once locked, the connector 440 can only be removed by moving the arms 460 via the actuatable sections 530, e.g., by pulling the actuatable sections 530 outward. In various implementations, actuating the arms 460 can be performed without an external tool, e.g., screwdriver, pliers, wrench, etc. That is, in contrast to conventional external electronic component connections in audio devices, the audio devices 10 have a connector 440 that enables tool-less coupling and decoupling of the earpiece 400 and the electronic component 420. In other words, the electronic component 420 and the earpiece 400 are configured to be coupled and decoupled by hand, without the aid of an external tool.

The example electronic component 420 in FIGS. 5-10 can include any number of electronic components described herein. In some cases, the earpiece 400 forms an acoustic seal around the ear of a user, and/or around the entrance to the ear canal of a user. In certain cases, when connected with the earpiece 400 in the slot 410, the electronic component 420 and the earpiece 400 are positioned to form an acoustic seal around the ear of the user. That is, in various implementations, when the electronic component 420 is engaged with the earpiece 400 (e.g., in the locked position), they collectively seal the earpiece cavity. In certain implementations, such as where the audio device 10 includes noise cancelation capabilities, the acoustic seal around the user's ear can aid in noise cancelation functions. For example, the acoustic seal can aid in passive noise cancelation or reduction (PNC or PNR), and in some cases, can aid in active noise cancelation or reduction (ANC or ANR).

Figure 12:
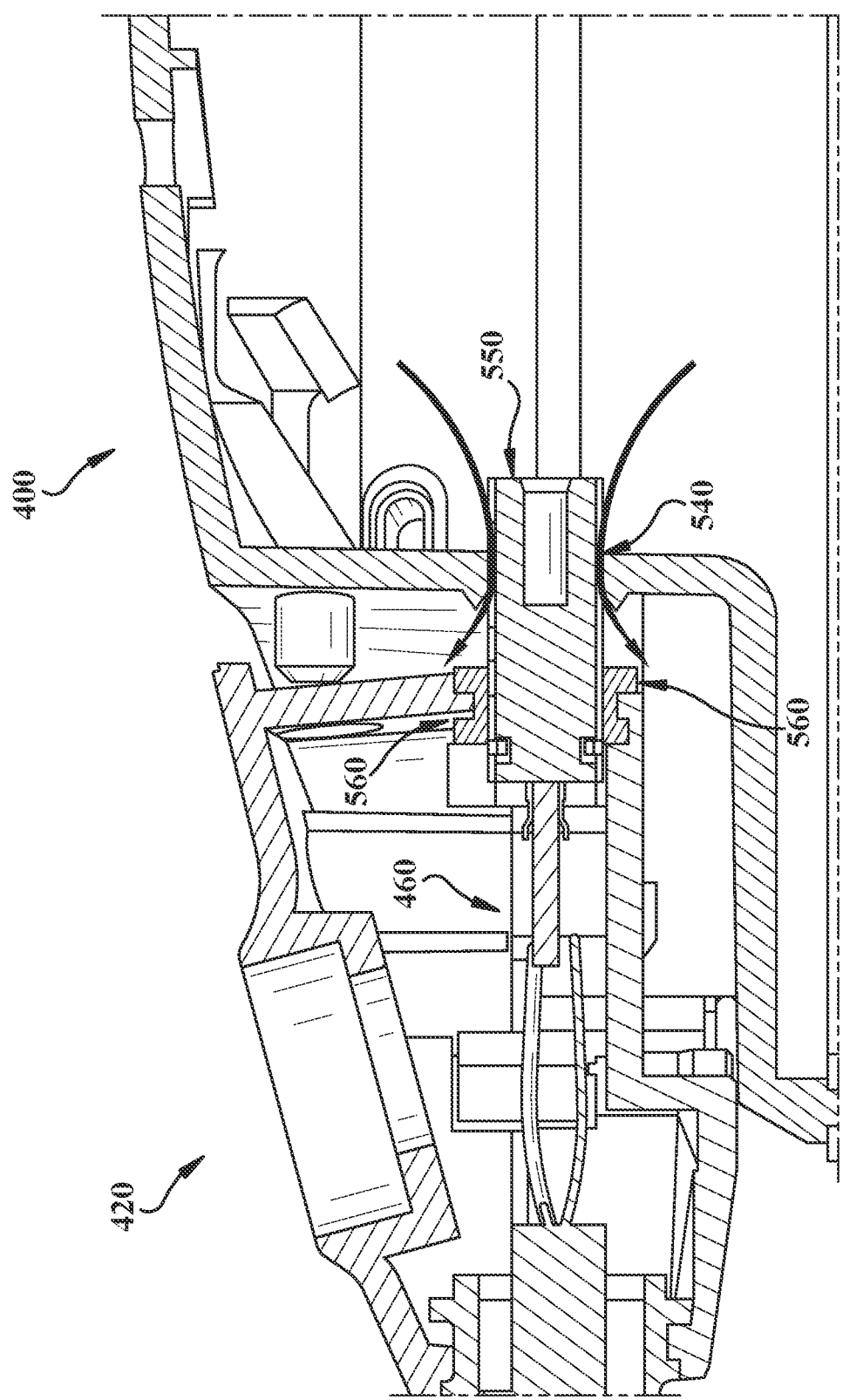
FIG. 12 is a cross-sectional view of an electronic component engaging an earpiece according to various implementations.
Figure 13:
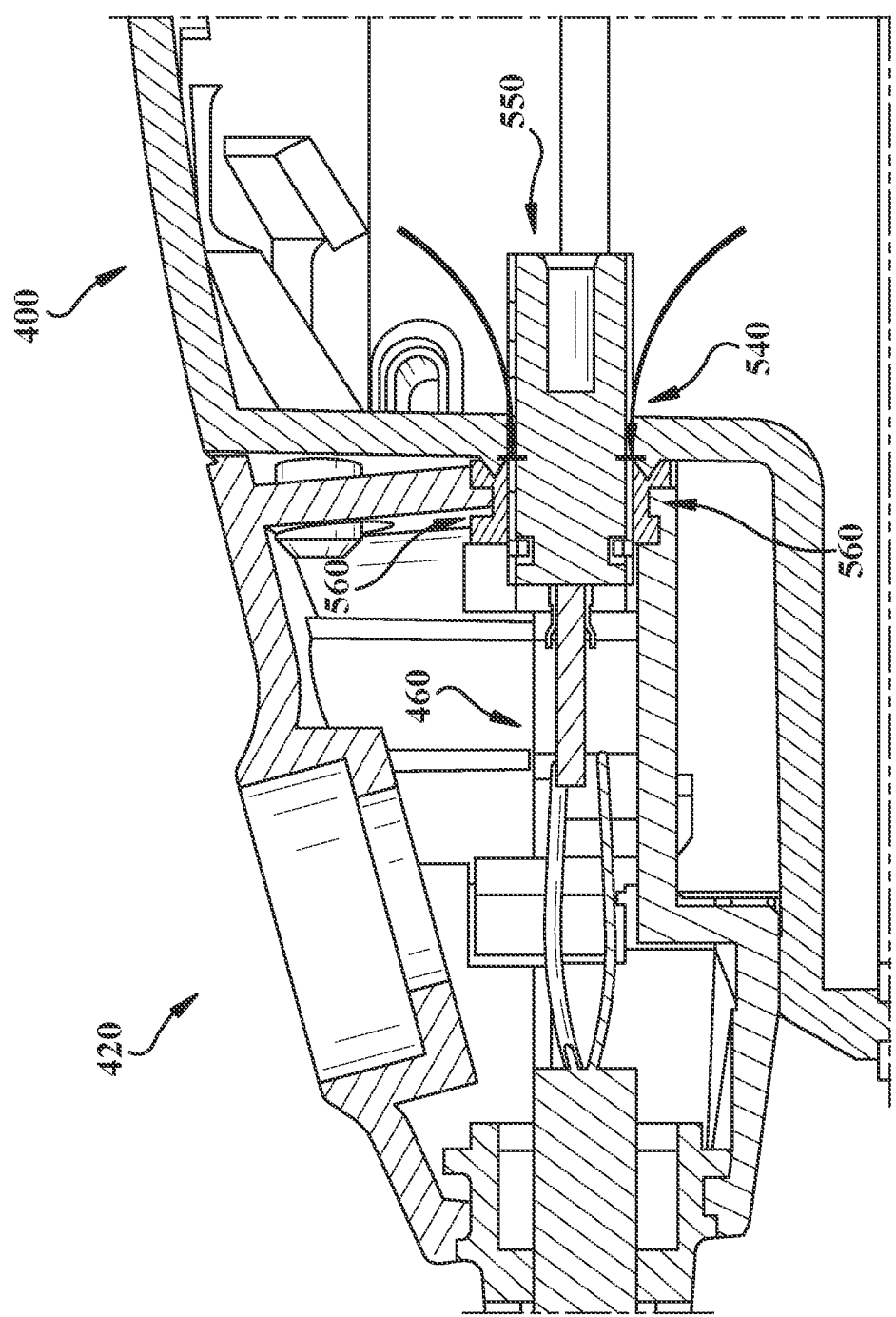
FIG. 13 shows the electronic component and earpiece from FIG. 12, in a locked position.

As can be seen in FIGS. 6, 8 and 10, the earpiece 400 can also include an opening 540 connected with the slot 410 for accommodating an electronic component connection 550 (e.g., FIGS. 5 and 6). In some cases, the electronic component connection 550 includes an electrical and/or data connection, such as a power connection to the earpiece, or a communications or other data connection. FIGS. 12 and 13 show cross-sectional views of portions of the earpiece 400 and the electronic component 420 in two positions, e.g., in a contacting but not locked position in FIG. 12 (similar to FIG. 7), and in an engaged, or locked position in FIG. 13 (similar to FIGS. 9 and 11). In the locked position shown in FIG. 13, the earpiece 400 is configured to engage a gasket 560 proximate the electronic component connection 550 for sealing the electronic component 420 connection with the earpiece 400. In some cases, the gasket 560 surrounds the electronic device connection, and in particular cases, the gasket 560 seals the housing of the electronic component 420 proximate to the electronic component connection 550. In certain cases, the electronic component 420 is potted to additionally seal the electronic component connection 550 and the slot 410 in the locked position (FIG. 13). In certain cases, the sealed electronic component connection 550 approximately isolates electrical noise from movement of the electronic component 420 relative to the earpiece 400. For example, in some cases the electronic component 420 is configured to move relative to the earpiece 400 while in the locked position. For example, where the electronic component 420 includes a boom microphone, the boom microphone can be configured to rotate relative to the earpiece 400. In these cases, the gasket 560 isolates electrical noise from movement of the boom microphone relative to the earpiece 400.

In contrast to conventional audio devices, the audio devices 10 according to various implementations provide a number of benefits. For example, the audio devices 10 according to various implementations enable modular electronic device interaction without requiring external tools. Additionally, these audio devices 10 are configured to provide reliable sealing of the electronic devices and earpieces, for both noise reduction/cancelation and electrical noise isolation. Even further, the attachment mechanism in audio devices 10 is configured to counter downward force, e.g., on an electronic component, to ensure constant electrical connection when engaged. The audio devices 10 shown and described according to various implementations can enhance the user experience, as well as improve performance, relative to conventional audio devices.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

The invention claimed is:

1. A wearable audio device, comprising:
    a headband for contacting a head of a user;
    an earpiece coupled with the headband for positioning proximate an ear of the user, the earpiece including an electro-acoustic transducer configured to output audio; and
    a slot configured to engage a component, wherein the slot includes one or more snap-fit and/or friction-fit connectors for selectively engaging the component and forming a seal with the earpiece,
    wherein the slot is configured to engage a plurality of distinct types of component.

2. The wearable audio device of claim 1, wherein each of the snap-fit and/or the friction-fit connectors includes at least one fixed protrusion within the slot that is sized to complement a movable arm of the component when in a locked position.

3. The wearable audio device of claim 2, wherein each of the snap-fit and/or friction-fit connectors is aligned to provide a resistive force against the moveable arm in response to a downward force on the component while in the locked position.

4. The wearable audio device of claim 2, wherein the at least one fixed protrusion includes an opening configured to engage and disengage the moveable arm on the component.

5. The wearable audio device of claim 1, wherein the one or more snap-fit and/or friction-fit connectors includes a pair of snap-fit connectors or a pair of friction-fit connectors for selectively engaging a pair of movable arms of the component.

6. The wearable audio device of claim 1, wherein the component is configured to be inserted in the slot in a first direction, and when engaged, the one or more snap-fit and/or friction-fit connectors alone prevent movement of the component relative to the slot in a second direction that is opposite the first direction.

7. The wearable audio device of claim 1, wherein the one or more snap-fit and/or friction-fit connectors enables toolless coupling and decoupling of the earpiece and the component.

8. The wearable audio device of claim 1, wherein the seal forms an acoustic seal around the ear of the user, wherein the acoustic seal aids in noise cancelation or reduction functions of the wearable audio device.

9. The wearable audio device of claim 1, wherein the seal is formed using a gasket.

10. The wearable audio device of claim 9, wherein the seal approximately isolates electrical noise from movement of the component relative to the earpiece.

11. The wearable audio device of claim 9, wherein the component is potted to additionally seal a component connection and the slot.

12. A component configured to engage with the wearable audio device of claim 1, the component comprising:
    at least one moveable arm configured to engage the one or more snap-fit and/or friction fit connectors in the slot of the earpiece; and
    a gasket for forming a seal with the earpiece.

13. The component of claim 12, wherein each of the snap-fit and/or the friction-fit connectors includes at least one fixed protrusion within the slot that is sized to complement the at least one movable arm of the component when in a locked position,
    wherein each of the snap-fit and/or friction-fit connectors is aligned to provide a resistive force against the at least one moveable arm in response to a downward force on the component while in the locked position.

14. The component of claim 12, wherein the one or more snap-fit and/or friction-fit connectors includes a pair of snap-fit connectors or a pair of friction-fit connectors for selectively engaging a pair of movable arms of the component.

15. The component of claim 12, wherein the component is configured to be inserted in the slot in a first direction, and when engaged, the one or more snap-fit and/or friction-fit connectors alone prevent movement of the component relative to the slot in a second direction that is opposite the first direction.

16. The component of claim 12, wherein the gasket surrounds an electronic device connection, and wherein the seal approximately isolates electrical noise from movement of the component relative to the earpiece.

17. A wearable audio device, comprising:
    a headband for contacting a head of a user;
    an earpiece coupled with the headband for positioning proximate an ear of the user, the earpiece including an electro-acoustic transducer configured to output audio; and
    a slot configured to engage a component, the component including a boom microphone,
    wherein the slot includes one or more snap-fit and/or friction-fit connectors for selectively engaging the boom microphone and forming a seal with the earpiece,
    wherein the seal is formed using a gasket, and wherein the gasket isolates electrical noise from movement of the boom microphone relative to the earpiece.

18. The wearable audio device of claim 17, wherein each of the snap-fit and/or the friction-fit connectors includes at least one fixed protrusion within the slot.

19. A wearable audio device, comprising:
    a headband for contacting a head of a user;
    an earpiece coupled with the headband for positioning proximate an ear of the user, the earpiece including an electro-acoustic transducer configured to output audio; and
    a slot configured to engage a component, wherein the slot includes one or more snap-fit and/or friction-fit connectors for selectively engaging the component and forming a seal with the earpiece,
    wherein the seal forms an acoustic seal around the ear of the user, and wherein the acoustic seal aids in noise cancelation or reduction functions of the wearable audio device.

20. The wearable audio device of claim 19, wherein each of the snap-fit and/or the friction-fit connectors includes at least one fixed protrusion within the slot that is sized to complement a movable arm of the component when in a locked position.

* * * * *